United States Patent
Tillerot et al.

[19]

[11] Patent Number: 6,002,504
[45] Date of Patent: Dec. 14, 1999

[54] DEVICE FOR THE FREQUENCY TRANSPOSITION OF OPTICAL SIGNALS

[75] Inventors: François Tillerot, Plouigneau; Mouhammad Jamil Chawki, Lannion; Georges Claveau, La Roche Derrien, all of France

[73] Assignee: France Telecom, Paris, France

[21] Appl. No.: 08/676,521

[22] Filed: Jul. 2, 1996

[30] Foreign Application Priority Data

Jul. 5, 1995 [FR] France ................................... 95 08132

[51] Int. Cl.$^6$ ................................................. H04B 10/00
[52] U.S. Cl. .................... 359/172; 359/127; 359/130; 359/139; 359/326; 385/24
[58] Field of Search ........................... 359/172, 189, 359/192, 127, 130, 326, 139; 385/9, 27, 37, 24

[56] References Cited

U.S. PATENT DOCUMENTS

| 5,388,001 | 2/1995 | Okayama et al. | 359/629 |
| 5,589,967 | 12/1996 | Auffret | 359/127 |
| 5,619,368 | 4/1997 | Swanson | 359/326 |
| 5,636,301 | 6/1997 | O'Sullivan et al. | 385/24 |
| 5,654,812 | 8/1997 | Suzuki | 359/139 |
| 5,701,188 | 12/1997 | Shigematsu et al. | 359/130 |
| 5,748,349 | 5/1998 | Mizrahi | 359/130 |
| 5,751,456 | 5/1998 | Koonen | 359/127 |

FOREIGN PATENT DOCUMENTS

| 0 390 524 | 10/1990 | European Pat. Off. |
| 3197932 | 8/1991 | European Pat. Off. |

OTHER PUBLICATIONS

Lee et al.; Routing and Switching in a Wavelength Convertible Optical Network, IEEE INFORCOM '93, vol. 2, pp. 578–585.

*Primary Examiner*—Jeffery A. Hofsass
*Assistant Examiner*—John Tweel, Jr.
*Attorney, Agent, or Firm*—Nilles & Nilles SC

[57] ABSTRACT

A device for the frequency transposition of optical signals receiving data elements liable to be at different wavelengths ($\lambda 0, \lambda 1 \ldots \lambda n$) and capable of delivering, at output, these data elements at one of the reception wavelengths. The device comprises a circulator (30); at least one optical arm comprising a rejection filter (31) followed by a wavelength converter (32); the circulator comprising a port for the reception of the data packets at the different wavelengths ($\lambda 0, \lambda 1 \ldots \lambda n$), a port for the transmission of data packets without changing their wavelength and at least one other port for each optical arm, so that each of these ports is connected to a rejection filter (31) to receive the data packets at the different wavelengths and reintroduce the data packets reflected by this filter into the circulator; the converter (32) at output of each rejection filter enabling the conversion into a desired wavelength of the data packets not reflected by the filter. The invention can be applied to asynchronous packet or synchronous frame transmission packets.

7 Claims, 2 Drawing Sheets

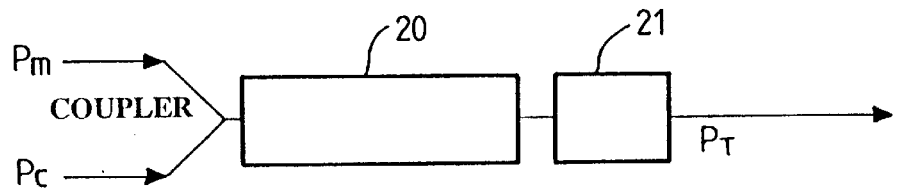
FIG_1
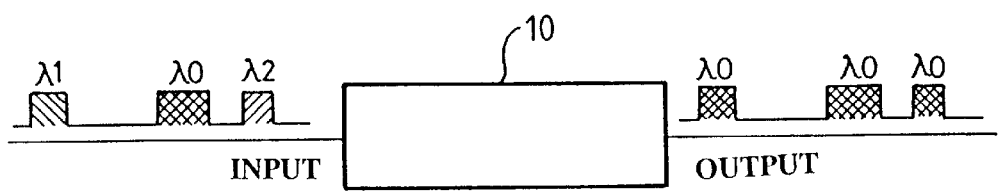
FIG_2
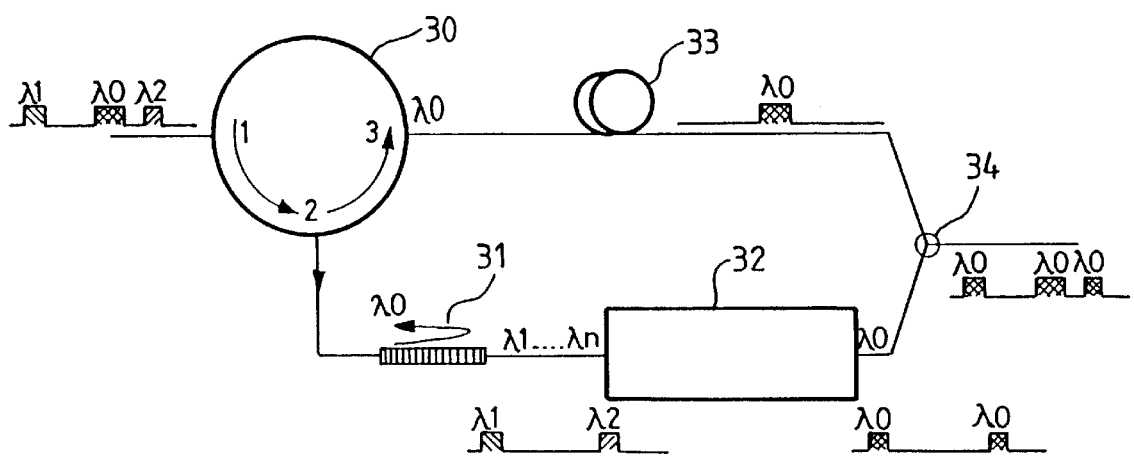
FIG_3

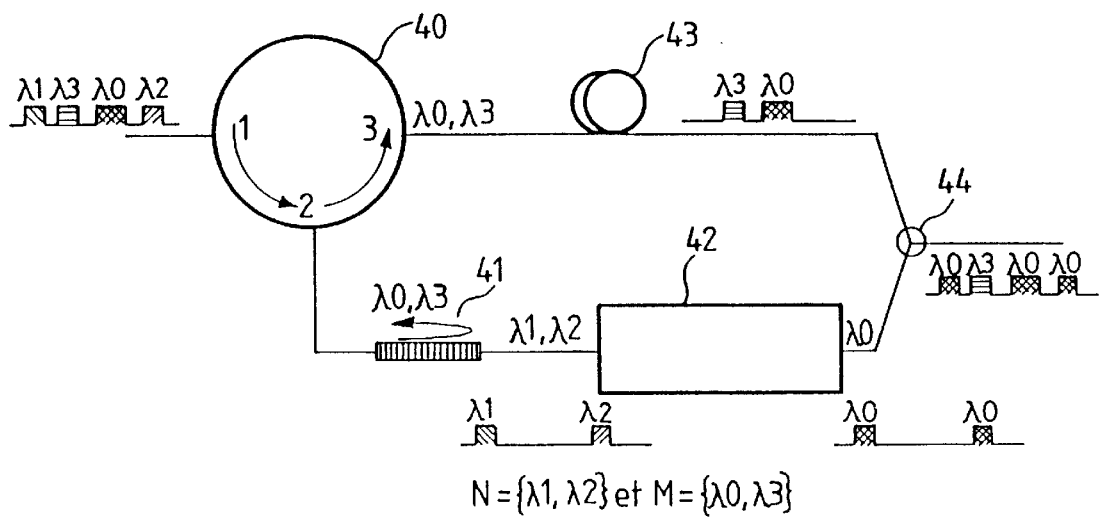
FIG_4
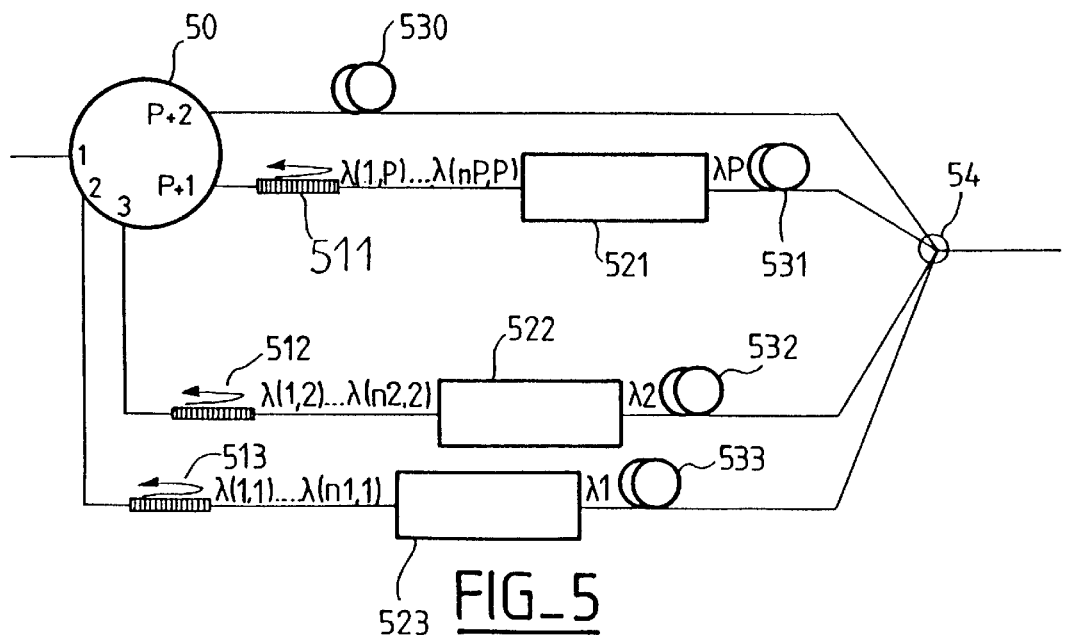
FIG_5

DEVICE FOR THE FREQUENCY TRANSPOSITION OF OPTICAL SIGNALS

BACKGROUND OF THE INVENTION

1. Field of the Invention

The invention relates to a device for the frequency transposition of optical signals, namely a device enabling a wavelength transposition to be carried out on the signals.

The present invention finds applications in optical telecommunications systems, especially packet transmission networks, namely in optically frequency-transposed wavelength multiplexed packet transmission networks. They may be synchronous frames or asynchronous packets conveyed at different carrier lengths.

The performance characteristics of the optical fiber as a transmission medium mean that it is possible to envisage the conveyance of information over increasingly greater distances. The development of optical components for the transmission of modulated signals, reception as well as the development of optical amplifiers have led to the designing of high bit rate networks that seek to share the very wide transmission band offered by the optical fiber with several channels, each channel using the band necessary for the electronic systems.

This principle has served as the basis for proposals for optical wavelength multiplexed local networks, the designing of optical access networks combining optical multiplexing and synchronous temporal electronic multiplexing and optical packet networks in asynchronous transfer mode applications.

In many studies, it is proposed to share the transmission passband of the optical fiber among different channels that are represented by a specific optical frequency per channel.

The use of this technique, known as optical frequency division multiplexing (OFDM) or wavelength division multiplexing (WDM) is warranted by the discovery of optical functions enabling the processing of optical channels: filtering, extraction, insertion of channels, demultiplexing and wavelength conversion. The last-named technique of wavelength conversion enables the signal to be transferred from one carrier wavelength to another.

The usefulness of wavelength conversion depends on the type of network and the rules of management of the wavelengths used. However it can easily be seen that it offers great flexibility in the management of the channels, especially in the context of switched networks (synchronous or asynchronous) when the phenomenon of contention has to be avoided. This phenomenon corresponds to the blocking that arises when two signals of the same wavelength are conveyed by distinct physical media of the networks and, after passage into a switching node, have to be transmitted on the same physical medium.

Wavelength conversion also facilitates the reutilization of the wavelengths when two networks have to be connected. In short, it makes it possible to consider the field of the optical frequencies as a perfectly flexible resource as regards its management.

2. Description of the Prior Art

The techniques available today can be used most often to obtain efficient wavelength conversion over a wide range of wavelength (namely over a wide possible range for ($\lambda 0$, $\lambda 1$ . . . $\lambda n$), transparent to the bit rate conveyed on the wavelengths and independently of the state of polarization of the incident signals. However, to date, there are no simple techniques enabling the "pseudo-transposition" of $\lambda 0$ to $\lambda 0$ for example without causing deterioration in the quality of the optical signal.

Now, this problem is encountered when it is desired to achieve an optical frequency transposition and when, among the input signals to be transposed, there are signals which are at the transposition wavelength. This may occur in the case of the transmission of wavelength multiplexed packets.

What has to be done therefore is to convert the signals at wavelengths of $\lambda 0$, $\lambda 1$ . . . $\lambda n$ into a wavelength of $\lambda 0$. Devices to achieve this function have already been designed. However, the use of one of these devices without any particular precaution entails the risk of considerably modifying the quality of the signals that arrive at the wavelength $\lambda 0$.

One of the known techniques of wavelength transposition that is simplest to implement makes use of the compression of the gain of the semiconductor amplifiers.

A schematic drawing of an experimental device is shown in FIG. 1. Continuous power $P_c$ at the wavelength $\lambda 0$ (probe) is injected at the same time as the intensity modulated $P_m$ signal $\lambda i$ into a semiconductor optical amplifier. At output $P_T$ of the amplifier and filtering means 20 and 21, the signal of the probe is modulated by the variations of the gain which are related to the variations of intensity of the incident signal ($\lambda i$). Should $\lambda 0=\lambda i$, the continuous signal injected (probe) appears as a spurious signal. The rate of extinction of the optical signal is therefore deteriorated.

One approach could consist in modulating the pump signal so as not to inject it when $\lambda 0=\lambda i$. This approach however is difficult to implement because of problems of synchronization. Indeed, it is necessary to know the time at which the probe must be extinguished to let through the packet or the frame at the wavelength $\lambda 0$.

OBJECTS AND SUMMARY OF THE INVENTION

The device proposed in the present invention does not have these drawbacks. The present invention makes it possible to resolve these problems.

Its object particularly is a device for the frequency transposition of optical signals receiving data elements liable to be at different wavelengths ($\lambda 0$, $\lambda 1$ . . . $\lambda n$) and capable of delivering, at output, these data elements at one of the reception wavelengths. For this purpose, the device comprises:

a circulator;

at least one optical arm comprising a rejection filter followed by a wavelength converter;

the circulator comprises a port for the reception of the data packets at the different wavelengths ($\lambda 0$, $\lambda 1$ . . . $\lambda n$), a port for the transmission of data packets without changing their wavelength and at least one other port for each optical arm so that each of these ports is connected to a rejection filter to receive the data packets at the different wavelengths and reintroduce the data packets reflected by this filter into the circulator; the converter at output of each rejection filter enabling the conversion into a desired wavelength of the data packets not reflected by the filter.

According to another object of the invention, depending on the application, the rejection filters will be chosen so that they can reject one or more wavelengths.

According to another object of the invention, the filters are obtained by one or more photo-recorded Bragg gratings.

According to one embodiment, the device comprises a three-port circulator, a rejection filter for at least one wavelength $\lambda 0$ followed by a converter at the wavelength $\lambda 0$.

According to another embodiment, the device comprises a circulator with n ports, p arms each having a rejection filter, with p<n, each filter being connected to a port of the circulator and being followed by a wavelength converter so as to separate p packets of data elements arriving at wavelengths $\lambda(1,p) \ldots \lambda(np,p)$ and transpose them respectively into the wavelength $\lambda 1 \ldots \lambda p$.

According to another object of the invention, the device has an optical coupler comprising at least two inputs and one output to receive the optical signals coming from the converter or converters and from the port of the circulator which delivers the signals reflected by the filters.

The device applies especially to a network for the transmission of optical signals taking the form of asynchronous packets or synchronous frames that succeed one another in time at different wavelengths $\lambda 0, \lambda 1 \ldots \lambda n$.

BRIEF DESCRIPTION OF THE DRAWINGS

The invention will be understood more clearly from the following description, given by way of a non-restrictive example and made with reference to the appended figures, of which:

FIG. 1 shows a schematic view of a prior art device,

FIG. 2 shows a schematic view of the invention,

FIG. 3 shows a diagram of an embodiment,

FIG. 4 shows an alternative method of obtaining the device of the invention,

FIG. 5 shows a second variant of the invention.

DESCRIPTION OF THE PREFERRED EMBODIMENTS

The invention is described in its application to the frequency transposition of optical packets or parts of synchronous frames. The function fulfilled by the device 10 is as follows: at input of the device, a series of packets (or synchronous frames) is injected. These packets succeed one another in time at different wavelengths referenced $\lambda 0$, $\lambda 1 \ldots \lambda n$. The device is therefore considered in the context of time division multiplexing and optical frequency division multiplexing. At output, there is the same series of packets (or synchronous frames) but all are borne by the same wavelength $\lambda 0$.

A drawing showing the principle of this function is given in FIG. 2. A function of this kind is valuable in optical wavelength multiplexed networks (the multiplexing is then solely frequential, and the temporal aspect disappears) in networks combining synchronous time division multiplexing and wavelength multiplexing, in frequency transposed packet networks as well as in the interconnection of networks using tables for the allocation of common wavelengths (at least partially).

The device 10 according to the invention has optical components transparent to the direction of the bit rate, insensitive to the state of polarization, whose substantial development in the last few years is such that it is possible to forecast high reliability and a relatively low cost in the near future. Apart from a wavelength transposition circuit, the chosen structure and technology of which have no effect on the working of the frequency transposition device, an optical circulator and a photo-recorded fiber filter are used.

FIG. 3 gives a schematic view of the device proposed. It comprises:

a three-port optical circulator 30 (numbered 1, 2 and 3 in the figure), whose transfer function is similar to that of the electrical circulators used in microwave applications. The optical power entering at 1 is recovered at 2 while the signal injected into 2 emerges at 3. Devices of this kind already exist in the market and have substantial insulation in the counter-directional sense and fairly low losses in the direction of the circulation. In the device proposed, the signals (packets or frequency transposed synchronous frames) are injected into the input 1 of the circuit;

a rejection filter 31 at the wavelength $\lambda 0$ placed at the port 2 of the circulator mentioned here above. The function of this filter is to let through the optical signals at the wavelengths different from $\lambda 0$ while the signals at $\lambda 0$ are reflected. It is possible now to make devices of this kind (for $\lambda 0$ fixed) through the photo-recording of the Bragg network in the fibers. The shape of the transfer function may be adjusted by choosing the characteristics of the Bragg network; Through this network, only the wavelengths different from $\lambda 0$ reach the conversion system:

a wavelength conversion device 32 placed in series with the photo-recorded filter. The function of this device is to convert the signals at the wavelength $\lambda 0$;

an optical delay 33 placed at the output 3 of the circulator. The duration of this delay is computed so that the time of propagation of the optical signals in the arms 2 and 3 of the circulator is the same;

a passive optical coupler 34 connects the arms 2 (output of the converter) and 3 (output of the delay line) of the circulator.

Converters of this kind are commercially available. Reference may be made besides for a more detailed description to the publication OFC 94, Technical Digest, Part ThQ3, "Simple wavelength converter for bit-rate independent operation at data rates as high as 10 Gbit/s".

On the basis of this principle, it is possible to set up packet frequency transposition systems (or synchronous frame frequency transposition systems) with different functions. Hereinafter, two types of variants of the device presented here above are proposed.

1. A first variant is used to perform a selective frequency transposition of a set of n among m packets (or frames).

The objective of this device therefore is to achieve the frequency transposition of all the packets (or all the frames) whose wavelengths are included in a set $N=(\lambda 1, \lambda 2, \ldots, \lambda n)$ at the same wavelength $\lambda 0$ (such that $\lambda 0 \notin N$). By contrast, if the wavelength of the other packets (or frames) is part of another set $M=(\lambda 0, \lambda n+1, \lambda n+2 \ldots \lambda m)$, this wavelength is not modified. It may be noted that it is possible to have $\lambda 0 \in M$.

This system is an extension of the previously described system. In fact, this system corresponds to the case where $M=(\lambda 0)$.

FIG. 4 gives a schematic view of a device performing the desired function. It comprises:

a three-port optical circulator 40 (numbered 1, 2 and 3 in the figure).

In the proposed device, the signals (frequency transposed packets or synchronous frames) are injected into the input 1 of the circulator, a wavelength conversion device 42 placed in series with the photo-recorded filter. The function of this device is to convert the signals at the wavelength $\lambda 0$, an optical delay 43 placed at the output 3 of the circulator. The duration of this delay is computed so that the propagation time of the optical signals in the arms 2 and 3 of the circulator is the same, a passive optical coupler 44 connects the arms 2 (output of the converter) and 3 (output of the delay line) of the circulator.

2. A second variant enables the performance of a frequency transposition of P sets of packets (or frames).

The function of this device is to achieve the frequency transposition of P sets of packets. Each of these sets corresponds to a set of wavelengths. The first set of packets is formed by packets (or frames) at the wavelengths {λ(1,1) . . . λ(n1,1)}. The packet number P is formed by wavelengths {λ(1,P) . . . λ(nP,P)}. It may be noted that these sets are not necessarily disjoined: it is possible to have the same wavelength in two sets.

The device achieves the frequency transposition of the packets of the first set at the wavelength λ1, the packets of the second at λ2, etc. Furthermore, if a packet arrives at a wavelength belonging to none of the P sets, the frequency transposition of this packet is not modified.

The techniques usually proposed to achieve this function make use of a separation of the channels by means of a wavelength demultiplexer (using a grating for example) and then propose the parallel processing of each of the channels thus separated. The proposed device according to the invention makes it possible to overcome the need for a demultiplexing operation.

The device is equivalent to the series connection of P devices identical to that of FIG. 4. It is possible to group the set by means of a circulator with P+2 arms. The schematic diagram is in FIG. 5.

In the proposed device, the signals (packets or frequency transposed synchronous frames) are injected into the input 1 of the circulator. It comprises:

an optical circulator 50 with P+2 ports (numbered 1, 2, . . . , P+2 in the figure), P rejection filters 511 to 513. The $i^{th}$ filter rejects all the wavelengths that do not belong to the set {λ(1,i), λ(2,i) . . . λ(ni,i)}. It is placed at the port i+1 of the circulator mentioned here above. The function of this filter is to let through the optical signals at the wavelengths that do not belong to {λ(1,i), λ(2,i) . . . λ(ni,i)}, while the others are reflected. The principle of the making of these filters is identical to that of filters used for the previous system. For this purpose, several photo-recorded Bragg gratings are used, P wavelength conversion devices (521 to 523). The conversion device is series-connected with each photo-recorded filter. The function of the $i^{th}$ device is to convert the signals to the wavelength λi, P+1 optical delays 530 to 533. A delay is placed at the output 2, 3 . . . P+2 of the circulator. The duration of this delay is computed so that the time of propagation of the optical signals in each of the arms 2 . . . P+2 of the circulator is the same, a passive optical coupler 54 (P+1 inputs, 1 output) connects the arms 2 to P+2 of the circulator.

To simplify the embodiment, this diagram shows only three arms with converter and rejection filters.

All the optical circuits used are commercially available. For the circulator, it is possible for example to take an optical circulator OFR of the firm Caldwell, N.J.

We claim:

1. Device for the frequency transposition of optical signals receiving data elements liable to be at different wavelengths (λ0, λ1 . . . λn) and capable of delivering, at output, these data elements at one of the reception wavelengths, characterized in that the device comprises:

a circulator (30);

at least one optical arm comprising a rejection filter (31) followed by a wavelength converter (32) and in that the circulator (30) comprises a port (1) for the reception of the data packets at the different wavelengths (λ0, λ1 . . . λn), a port (3) for the transmission of data packets without changing their wavelength and at least one other port (2) for each optical arm so that each of these ports is connected to a rejection filter (31) to receive the data packets at the different wavelengths and reintroduce the data packets reflected by this filter into the circulator; the converter (32) at output of each rejection filter enabling the conversion into a desired wavelength of the data packets not reflected by the filter.

2. A frequency transposition device according to claim 1, characterized in that the rejection filters (41, 512, 513) are capable of rejecting one or more wavelengths.

3. A frequency transposition device according to claim 2, characterized in that the filters are obtained by one or more photo-recorded Bragg gratings.

4. A frequency transposition device according to claim 1, characterized in that it comprises a three-port circulator (30, 40), a rejection filter for at least one wavelength λ0 followed by a converter at the wavelength λ0.

5. A frequency transposition device according to claim 1, characterized in that the device comprises a circulator (50) with n ports, p arms each having a rejection filter (521, 522, 523), p<n, each filter being connected to a port of the circulator and being followed by a wavelength converter so as to separate p data packets arriving at wavelengths {λ(1,1) . . . (n1,1)} . . . {λ(1,p) . . . λ(np,p)} and transpose them respectively into the wavelength λ1 . . . λp.

6. A frequency transposition device according to claim 1, characterized in that the device has an optical coupler comprising at least two inputs and one output to receive the optical signals coming from the converter or converters and from the port of the circulator that delivers the signals reflected by the filters.

7. A frequency transposition device according to claim 1, characterized in that it is used in a network for the transmission of optical signals taking the form of asynchronous packets or synchronous frames that succeed one another in time at different wavelengths λ0, λ1 . . . λn.

* * * * *